United States Patent [19]

Parr et al.

[11] 4,310,018

[45] Jan. 12, 1982

[54] CHECK VALVE ASSEMBLY

[75] Inventors: Erwin W. Parr; Timothy B. Brandt, both of Des Moines, Iowa

[73] Assignee: Parr Manufacturing Company, Des Moines, Iowa

[21] Appl. No.: 121,266

[22] Filed: Feb. 13, 1980

[51] Int. Cl.³ ............................................. F16K 15/04
[52] U.S. Cl. ................................................. 137/539.5
[58] Field of Search ..................................... 137/539.5

[56] References Cited

U.S. PATENT DOCUMENTS

| | | | |
|---|---|---|---|
| 790,056 | 5/1905 | Hilger | 137/539.5 |
| 2,042,216 | 5/1936 | Edwards | 137/539.5 |
| 2,945,508 | 7/1960 | Schweisthal | 137/539.5 X |
| 3,207,179 | 9/1965 | Klagues | 137/539.5 X |
| 4,076,043 | 2/1978 | Rogan | 137/539.5 |

*Primary Examiner*—William R. Cline
*Attorney, Agent, or Firm*—Henderson & Sturm

[57] ABSTRACT

This invention relates to check valve assemblies in general, and more specifically to an easy opening fuel line check valve assembly, wherein a cage structure which supports a free floating ball valve allows a relatively weak spring to be employed for the closing bias while avoiding the buckling problem normally associated with weak spring elements in similar valve assemblies.

1 Claim, 6 Drawing Figures

CHECK VALVE ASSEMBLY

BACKGROUND OF THE INVENTION

Fuel line check valves, by their very nature, are required to be extremely sensitive to fluid pressure differentials. The valve head must have a positive engagement with the seat, in a no flow or reverse flow situation; yet must be weakly biased against the seat, so that a nominal positive fluid pressure differential on the inlet side of the valve assembly will quickly unseat the valve to open fluid communications between the inlet and outlet.

The valve structures commonly employed in the auto industry for relatively small (2.3 liter) engines, generally comprise an elongated chamber in fluid communication with the inlet and outlet having a ball valve mounted on a long relatively weak helical spring. The major problem encountered with this type of an arrangement is that as the ratio of length to diameter (L/D) of the spring increases, the inherent stability of the spring decreases. The instability of the spring leads to buckling of that component, and chatter of the ball valve within the chamber, thereby causing turbulence and less than ideal "open flow" conditions.

To date there has not been devised a fuel line check valve assembly which meets the performance criteria desired while avoiding the problems enumerated, supra.

SUMMARY OF THE INVENTION

An object of the present invention is the provision of a fast acting fuel line check valve assembly which has positive seating and provides unrestricted "open flow" conditions.

A further object of the instant invention is the provision of a check valve assembly having a cage element, which acts as a guide for the biasing spring and prevents the buckling thereof.

Another object of the instant invention is the provision of a check valve assembly, which employs a free floating spring biased ball valve, partially contained within an apertured recess in a guide member.

Still another object of the present invention is the provision of a valve assembly, which utilizes a guide element having an orifice in fluid communication with the downstream side of a free floating ball valve, to insure positive seating of the valve head in a reverse flow situation.

Yet another object of the instant invention is the provision of a new and unique valve assembly, which accomplishes all of the objectives stated, supra, while avoiding the problems inherent in the prior art devices.

These and other objects, advantages and novel features of the instant invention will become apparent from the following detailed description of the invention when considered in conjunction with the accompanying drawings.

DETAILED DESCRIPTION OF THE PREFERRED EMBODIMENT

Figures 1, 2:
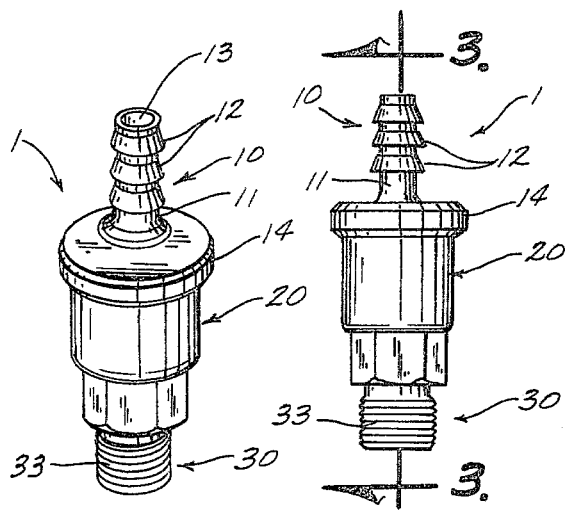
FIG. 1 is a perspective view of the housing for the valve assembly which forms the basis of the instant invention.
FIG. 2 is a side view of the housing for the valve assembly.

As can be seen by reference to FIG. 1 the valve assembly housing designated generally as 1, comprises an inlet section 10, a valve chamber 20 and a threaded outlet section 30.

The inlet section 10 comprises an elongated inlet nozzle 11 having a plurality of tapered barbs 12 disposed on its exterior surface, and an inlet port 13 formed in its interior. The barbs 11 are intended to cooperate with the interior of a fuel hose line, in a well-known manner, to establish fluid communication through the valve assembly.

The downstream end of the inlet section 10 is in the form of an enlarged flanged shoulder 14, having a circular recess 15 which sealingly receives the upper lip 21 of the cylindrical valve chamber 20. The lower end 22 of the valve chamber 20 is bent inwardly to contact a raised shoulder 31 on the outlet section 30, and the recessed surface 32 surrounding the shoulder 31 sealing engages the lower end 22 of the valve chamber 20. The downstream end 33 of the outlet section is threaded for engagement with a fluid coupling element (not shown), and an outlet port 34 extends through the outlet section 30 to establish fluid communication through the valve assembly.

The valve element 50 is disposed in the valve chamber 20 between the inlet section 10 and the outlet section 30, and comprises a free floating ball valve 50 which is dimensioned to be received within a recess 62 formed within a central extension 61 in the guide member 60.

The guide member 60 is a hollow generally cylindrical element having a central recess 62 in fluid communication with the downstream portion of the valve chamber 20 via a central orifice 64. Surrounding the central recess 62 are a plurality of radially disposed fluid orifices 66, which are in open fluid communication with the inlet port 13 and outlet port 34 when the valve assembly is in the position illustrated in FIG. 4. The guide member 60 is further provided with an elongated cylindrical skirt 68, whose external diameter is only slightly less than the internal diameter of the valve chamber 20.

A weak helical spring 80 whose length to diameter ratio is three or less (L/D$\leq$3) is interposed between the central extension 61 and the cylindrical skirt 68 of the guide element 60. The spring 80 bears on one end against the lower end 22 of the valve chamber, and on the other end against the underside of the guide element 60, to bias the ball valve 50 upwardly.

The mouth 14' of the inlet port 13 is enlarged to form a valve seat 15 which is contacted by the ball valve 50 in the no-flow or reverse flow situation.

Figure 3:
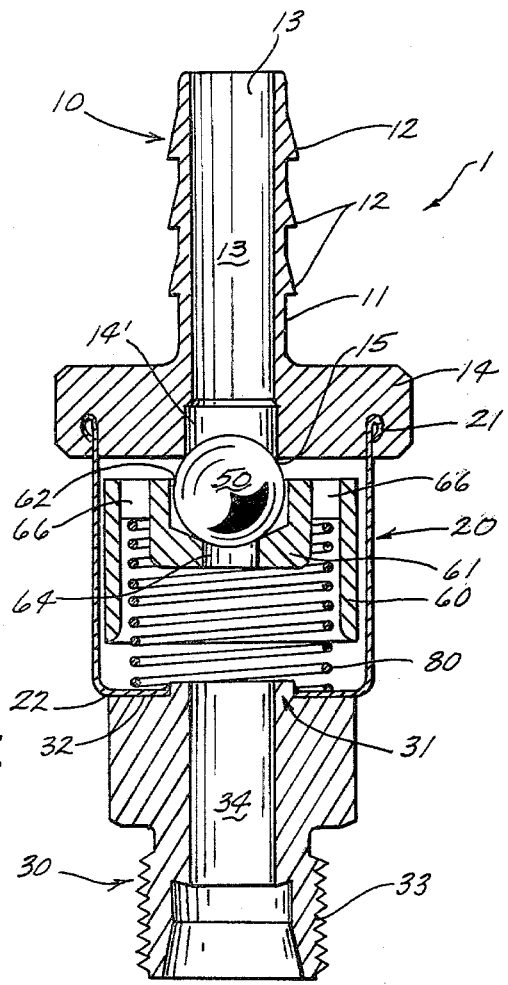
FIG. 3 is a cross-sectional view of the valve assembly taken thru line 3—3 of FIG. 2 showing the valve in the no flow or reverse flow condition.
Figure 5:
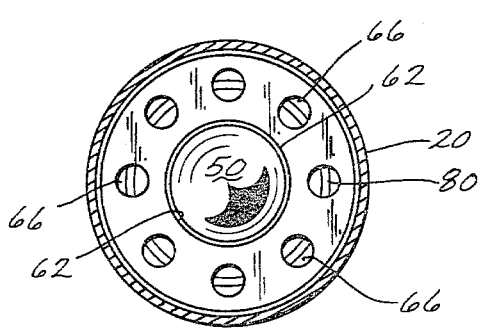
FIG. 5 is a cross-sectional view of the valve assembly, taken thru line 5—5 of FIG. 4, showing the disposition of the fluid orifices and free floating ball valve in the guide element.
Figure 6:
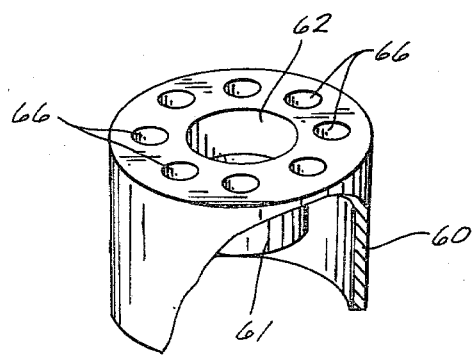
FIG. 6 is a detailed perspective view of the valve asembly guide element.

FIG. 3 illustrates the no flow or reverse flow condition in the valve assembly. The helical spring 80 has biased the ball valve 50 against the valve seat 15. As long as the fluid pressure in the valve chamber 20 is equal to or greater than the fluid pressure in the inlet port 13, the valve assembly will remain in this position.

Figure 4:
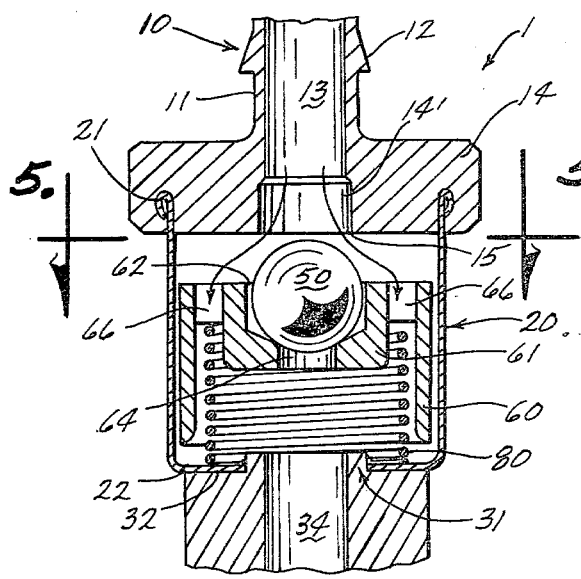
FIG. 4 is a detailed view of the valve assembly in the open flow condition.

When there is a positive pressure differential between the inlet port 13 and the valve chamber 20, i.e. inlet pressure is greater than chamber pressure, the biasing force of the spring 80 is overcome and the valve assembly will assume the position illustrated in FIG. 4. This is the "open flow" condition, and due to the plurality of fluid orifices 66 disposed on the guide element 60, unrestricted fluid communication is established between the inlet and outlet.

The design and configuration of the guide element 60 is crucial to the proper operation of the valve assembly. The central recess 62 allows the ball valve 50 to rotate freely within its confines, and the central orifice 64 subjects the ball valve to downstream pressure. The elongated skirt 68 of the guide 60 acts as a keeper mechanism for the spring 80 to prevent buckling, and further cooperates with the interior walls of the valve chamber to guide the ball valve 50 into the valve seat 15.

Since the ball 50 is free floating within the recess 62, even if the guide 60 is off-center as it approaches the valve seat 15, the ball valve 50 upon contacting the lip of the valve seat will center itself and the guide 60 in a reverse or no-flow situation. Furthermore, by using this arrangement a very weak helical spring can be employed in the assembly without worrying about the tendency of the spring to buckle. In fact, the spring can be chosen so that it just barely closes the inlet port in the no-flow situation, thereby insuring a quick opening valve assembly with minimal pressure differentials between the inlet and outlet.

Having thereby disclosed the subject matter of this invention it should be obvious that many modifications, substitutions an variations of the invention are possible in light of the above teachings. It is therefore to be understood that the invention may be practiced other than as specifically described, and should be limited only by the breadth and scope of the appended claims.

What we claim is:

1. An automotive fuel line check valve assembly designed for use in a minimal fluid pressure differential environment comprising:

a housing having an inlet port and an outlet port;

means forming a chamber within said housing, said chamber being in fluid communication with said inlet and outlet ports;

a spring biased reciprocating guide element having a generally cylindrical configuration in the form of an elongated cylindrical skirt member, which acts as a keeper mechanism for the biasing spring, and a plurality of fluid orifices radially disposed around a central recess formed in a central extension of the guide element, said central recess further being provided with a fluid orifice, in open communication with the fluid pressure downstream of the guide element, a free floating ball valve, dimensioned to be rotatably received within said central recess, which is subject to the fluid pressure upstream and downstream of said guide element, wherein the downstream pressure on the ball valve is sensed through the fluid orifice in central recess, and a helical spring, interposed between the central recess and cylindrical skirt, whose length to diameter ratio is such that the biasing spring force will only barely seat the ball valve in the inlet port during cessation of fluid flow through the assembly.

* * * * *